(12) United States Patent
Ciaffi et al.

(10) Patent No.: US 7,973,607 B1
(45) Date of Patent: Jul. 5, 2011

(54) RTC CIRCUIT WITH TIME VALUE ADJUSTMENT

(75) Inventors: Marco Ciaffi, Sudbury, MA (US); Daniel Wilder, Derry, NH (US)

(73) Assignee: EMC Corporation, Hopkinton, MA (US)

( * ) Notice: Subject to any disclaimer, the term of this patent is extended or adjusted under 35 U.S.C. 154(b) by 546 days.

(21) Appl. No.: 12/107,326

(22) Filed: Apr. 22, 2008

Related U.S. Application Data

(60) Provisional application No. 60/925,712, filed on Apr. 23, 2007.

(51) Int. Cl.
*H03L 7/00* (2006.01)

(52) U.S. Cl. ............ 331/16; 331/34; 713/178; 713/400; 713/601; 340/10.2; 340/10.5

(58) Field of Classification Search .................... 331/16, 331/34; 713/178, 601, 400; 340/10.2, 10.5
See application file for complete search history.

(56) References Cited

U.S. PATENT DOCUMENTS

| | | | |
|---|---|---|---|
| 6,085,320 A | 7/2000 | Kaliski | |
| 6,130,621 A | 10/2000 | Weiss | |
| 6,189,098 B1 | 2/2001 | Kaliski | |
| 6,269,163 B1 | 7/2001 | Rivest et al. | |
| 6,473,607 B1 * | 10/2002 | Shohara et al. | 455/343.1 |
| 7,197,639 B1 | 3/2007 | Juels et al. | |
| 7,298,243 B2 | 11/2007 | Juels et al. | |
| 7,363,494 B2 | 4/2008 | Brainard et al. | |
| 2004/0172535 A1 | 9/2004 | Jakobsson et al. | |
| 2006/0041759 A1 | 2/2006 | Kaliski et al. | |

* cited by examiner

*Primary Examiner* — Arnold Kinkead
(74) *Attorney, Agent, or Firm* — BainwoodHuang

(57) ABSTRACT

A technique involves the use of an electronic device having a real-time clock (RTC) circuit. In particular, the technique involves obtaining an RTC value from the RTC circuit. The RTC value is based on a previous time value and being arranged to represent current time. The technique further involves generating an adjustment factor arranged to adjust for imperfection in an oscillator of the RTC circuit, and providing a new time value based on the RTC value and the adjustment factor. The new time value represents current time at least as accurately as the RTC value.

20 Claims, 6 Drawing Sheets

RTC CIRCUIT WITH TIME VALUE ADJUSTMENT

CROSS REFERENCE TO RELATED APPLICATIONS

This application claims the benefit of U.S. Provisional Patent Application No. 60/925,712 filed on Apr. 23, 2007, entitled, "HANDLING IMPERFECT CRYSTAL OSCILLATORS", the contents and teachings of which are hereby incorporated by reference in their entirety.

BACKGROUND

A conventional authentication token is an apparatus which creates one-time passcodes (OTPs) for use in authenticating a user to an authentication entity. To this end, the user may press a button of the authentication token. The authentication token then derives a OTP from a seed (or encryption key), and displays the OTP on a display to the user.

In the context of authentication tokens which employ time-based algorithms, the OTP is valid for only a limited time period (e.g., one minute). If the user provides the OTP to the authentication entity within this time period, the authentication entity responds with positive authentication. However, if the user provides the OTP to the authentication entity after the time period expires, the authentication entity refuses to positively authenticate the user and the user must provide a new OTP from the authentication token to the authentication entity in order to properly authenticate with the authentication entity. Accordingly, even if an unauthorized person obtains a OTP, the OTP automatically becomes invalid after the time period elapses.

Some conventional authentication tokens have designated lifetimes of more than one year (e.g., three years). Upon expiration of an authentication token's lifetime, the authentication entity refuses to authenticate the user based on any further OTPs from that authentication token, and the user must obtain a new authentication token from the authentication service administrator.

SUMMARY

Imperfections typically exist within crystal oscillators which drive authentication tokens, and such imperfections cause time accuracy within the authentication tokens to drift over time, e.g., to drift ahead of actual time if the crystal frequency is too fast, or drift behind actual time if the crystal frequency is too slow. In order to compensate for such drift, authentication entities typically widen the time period within which the authentication entities treat OTPs as valid. For example, for authentication tokens that are arranged to produce a new OTP every minute, the authentication entity may consider any of multiple OTPs from an authentication token to be valid over a time range of several minutes in order to account for the possibility that time represented within the authentication token is ahead of or behind actual time (i.e., the current time from a common official source such as Official U.S. Time, Greenwich Mean Time, etc.). Unfortunately, widening the time period to account for imperfections within the crystal oscillator driving the authentication token results in lowering the level of authentication security since the authentication entity now, in turn, needs to consider more OTPs to be valid over the wider time range.

The following example further illustrates this situation. Suppose that a manufacturer of an authentication token measures the crystal oscillator frequency of an authentication token and, based on the frequency measurement, determines that the authentication token will be behind (or ahead) actual current time by one second every 1000 minutes of operation due to crystal oscillator imperfections. Furthermore, suppose that the token manufacturer specifies that the lifetime of the authentication token is three years.

For this example, if there are 525,600 minutes considered to be in each year, the designated total operating time for the authentication token is 1,576,800 minutes (three times the number of minutes in one year). One can divide this total operating time by 1000 to determine how many seconds behind (or ahead) the authentication token will be at the very end of the authentication token's lifetime. In this example, the result of this computation is 1576.8 seconds, i.e., the authentication token will be ahead of actual time by 1576.8 seconds (slightly more than 26 minutes) at the end of three years of operation.

To compensate for the possibility that authentication tokens from the token manufacturer may be as much as 26 minutes behind or ahead actual time at the end of their lifetime, the authentication entity widens its range of acceptable OTPs. That is, the authentication entity will positively authenticate the OTP for the actual time, as well as the OTPs that were valid for the last 26 minutes to account for an authentication token that is up to 26 minutes slower than actual time, and future OTPs that could be derived in the next 26 minutes to account for an authentication token that is up to 26 minutes faster than actual time. Accordingly, in the above-described approach, the authentication entity considers there to be 53 valid OTPs (or perhaps more for added margin) for each authentication token at any given time.

In contrast to the above-described approach of simply widening the time period for valid OTPs to account for imperfections within the crystal oscillators driving authentication tokens, improved techniques correct for time inaccuracies in electronic devices by performing time adjustments (e.g., pre-configured self-contained time corrections). Such techniques enable authentication tokens (and other electronic modules) to regularly resynchronize with actual current time during their lifetimes. Accordingly, such techniques alleviate the need to widen valid OTP time windows, or alternatively can be used in conjunction with widening valid OTP time windows to reduce the extent of such widening. Moreover, such correction operations alleviate the need for any future internal electronic access of the authentication tokens thus preserving token security.

One embodiment is directed to a method which is performed in an electronic device having a real-time clock (RTC) circuit. The method involves obtaining an RTC value from the RTC circuit. The RTC value is based on a previous time value and is arranged to represent current time. The method further involves generating an adjustment factor arranged to adjust for imperfection in an oscillator of the RTC circuit, and providing a new time value based on the RTC value and the adjustment factor. The new time value represents current time at least as accurately as the RTC value.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Improved techniques correct for time inaccuracies in electronic devices by performing predetermined time adjustments. Such techniques enable the electronic devices (e.g., authentication tokens) to regularly resynchronize with actual current time during their lifetimes. Accordingly, in the context of an authentication system, such techniques alleviate the need to widen valid OTP time windows, or alternatively can be used in conjunction with widening valid OTP time windows to reduce the extent of such widening. Moreover, such corrections alleviate the need to later gain internal electronic access to the authentication tokens therefore maintaining token security.

Figure 1:
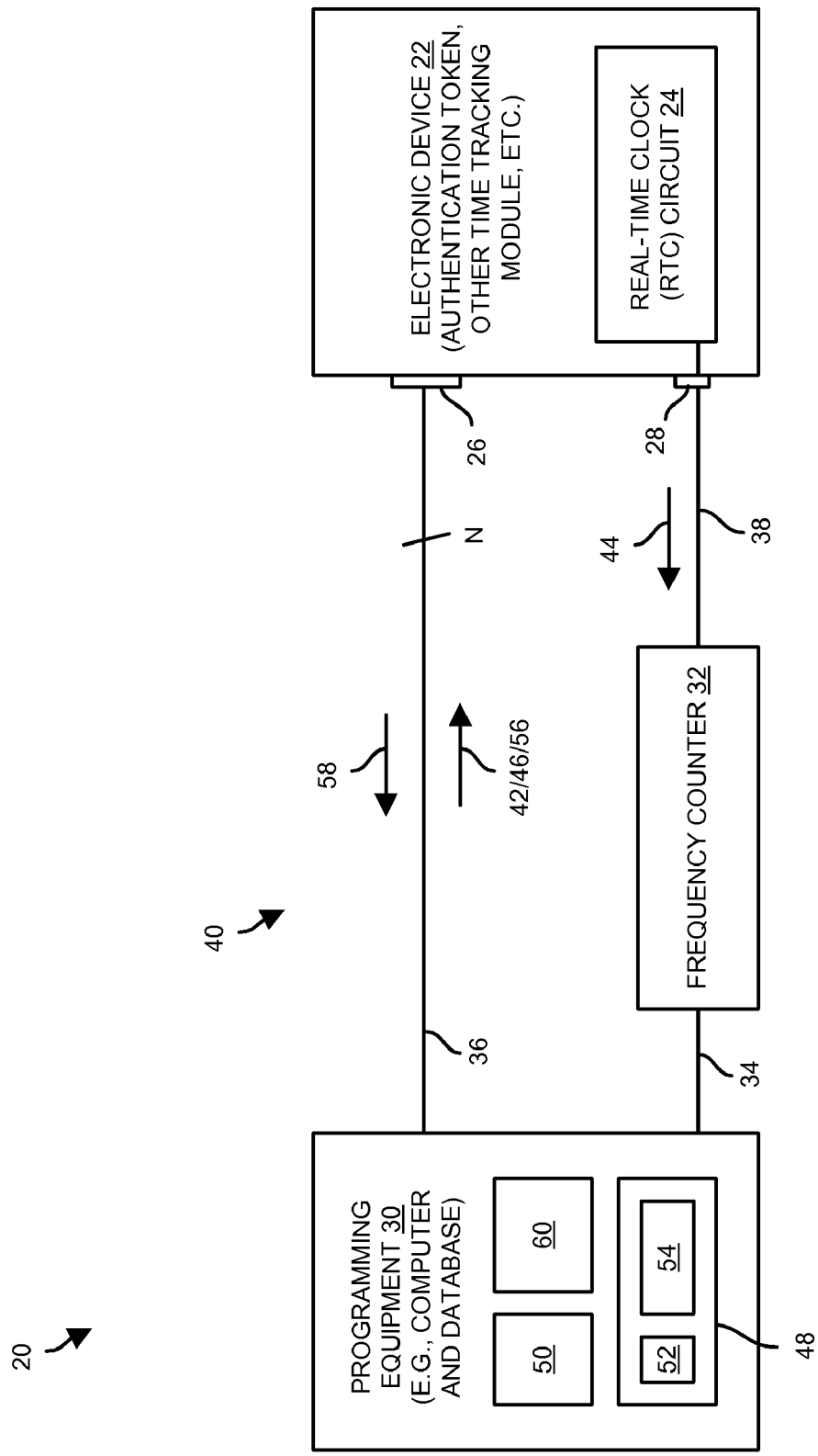
FIG. 1 is a block diagram of a programming station which is constructed and arranged to configure an electronic device to correct for time inaccuracies by performing self-contained time adjustments.

FIG. 1 shows a programming station 20 which is constructed and arranged to pre-configure an electronic device 22 to carry out regular self-contained time adjustments. The electronic device 22 includes, among other things, a real-time clock (RTC) circuit 24 which drives other circuitry within the electronic device 22, a set of programming contacts 26 (e.g., one or more contacts 26), and a clock output pad 28. Over time, the time adjustments correct for imprecision in the RTC circuit 24 such as imperfection in a crystal oscillator of the RTC circuit 24.

As shown in FIG. 1, the programming station 20 includes programming equipment 30 (e.g., a computer and a database), a frequency counter 32, a communications interface 34, a programming interface 36, and a probe 38. Such a programming station 20 is suitable for use at a manufacturer's facility to enable the manufacturer to pre-configure authentication tokens 22 prior to providing the authentication tokens 22 to users of an authentication service. A description of an example pre-configuration process will now be provided.

During operation of the programming station 20, the programming interface 36 (e.g., a set of programming heads) connects the programming equipment 30 to the set of programming contacts 26 of the electronic device 22. Similarly, the probe 38 connects the frequency counter 32 to the clock output pad 28 of the electronic device 22.

With the programming interface 32 and the probe 34 now in place, the programming station 20 exchanges electronic signals 40 with the electronic device 22. Such operation is capable of being carried out using automated equipment (e.g., a robotic assembly line) as part of an authentication token configuration/activation/personalization process.

As shown in FIG. 1, the programming equipment 30 sends a clock output command 42 to the electronic device 22 through the programming interface 36 to direct the electronic device 22 to provide its oscillator frequency 44 from the RTC circuit 24 on the clock output pad 28. The electronic device 22 responds to the clock output command 42 by outputting the oscillator frequency 44 on the clock output pad 28. The frequency counter 32 measures and records the oscillator frequency 44, and the programming equipment 30 reads the oscillator frequency 44 from the frequency counter 32 through the communications interface 34.

At this point, the programming equipment 30 sends another output control command 46 to the electronic device 22 directing the electronic device 22 to stop outputting the oscillator frequency 44 on the clock output pad 28. The electronic device 22 responds by no longer outputting the oscillator frequency 44 of the RTC circuit 24 on the clock output pad 28.

Next, the programming equipment 30 carries out an analysis of the oscillator frequency 44 and produces a correction parameter 48. In particular, the programming equipment 30 knows the ideal (or expected) oscillator frequency 50 for the RTC circuit 24 (i.e., frequency that would result if the RTC circuit 24 needed no time adjustment) and is thus able to determine whether the oscillator frequency 44 of the RTC circuit 24 is too slow or too fast. Accordingly, the programming equipment 30 is able to (i) easily make such a determination by comparing the oscillator frequency 44 from the electronic device 22 to the ideal oscillator frequency 50, and (ii) store a direction value indicating whether the oscillator frequency 44 is too fast or too slow in a direction field 52 of the correction parameter 48.

By way of example only, if the programming equipment 30 compares the oscillator frequency 44 of the RTC circuit 24 to the ideal oscillator frequency 50 and determines that the oscillator frequency 44 is too slow, the programming equipment 30 sets the value of a direction field 52 of the correction parameter 48 to "0". However, if the programming equipment 30 determines that the oscillator frequency 44 is too fast, the programming equipment 30 sets the value of the direction field 52 of the correction parameter 48 to "1".

Additionally, the programming equipment 30 computes an appropriate correction interval 34 for the RTC circuit 24 of the electronic device 22 and stores the computed correction interval 34 in the correction interval field 54 of the correction parameter 48. To this end, the correction interval 34 is defined as the number of minutes that must elapse before the RTC circuit 24 of the electronic device 22 is off by one second (e.g., +/−3% or some other standard error metric). For example, a value of "1200" for the correction interval 34 means that the time outputted by the RTC circuit 24 will be off the actual current time by one second after 1200 minutes of operation, i.e., behind the actual current time if the direction field 52 stores "0" and ahead of the actual current time if the direction field 52 stores "1". In other arrangements, the correction interval 34 is defined differently (e.g., the number of hours, days, etc. that must pass before the RTC circuit 24 is off by a particular amount of time).

Next, the programming equipment 30 sends time a time adjustment command 56 to the electronic device 22 to program the electronic device 22 with the correction parameter 48 (i.e., to calibrate the electronic device 22 with the contents of the direction and correction interval fields 52, 54) thus enabling the electronic device 22 to self-compensate for timing imperfections in the RTC circuit 24 in the future. As part of this pre-configuration process, the programming equipment 30 sets other parameters within the electronic device 22 (i.e., loads initial values into other fields) which will be accessed during time correction. It should be understood that, throughout this process, the programming equipment 30 is further capable of (i) confirming that the electronic device 22 is properly operating and configured, and (ii) obtaining additional information, by reading signals 58 from the electronic device 22 (e.g., get time correction parameter, get device serial number, etc.). The electronic device 22 preferably stores the results 60 of this exchange of signals 40 in a database for future reference.

It should be further understood that, while the programming interface 36 remains connected to the set of programming contacts 26 of the electronic device 22, the programming equipment 30 is capable of performing additional tasks relating to configuration/activation/personalization as well as other operations (e.g., testing, customizing, accurately initializing the RTC circuit 24 to a common time standard such as Official U.S. Time, atomic clock, GMT, other time standards that do not involve or that account for daylight savings time, and so on). Further details will now be provided with reference to FIG. 2.

Figure 2:
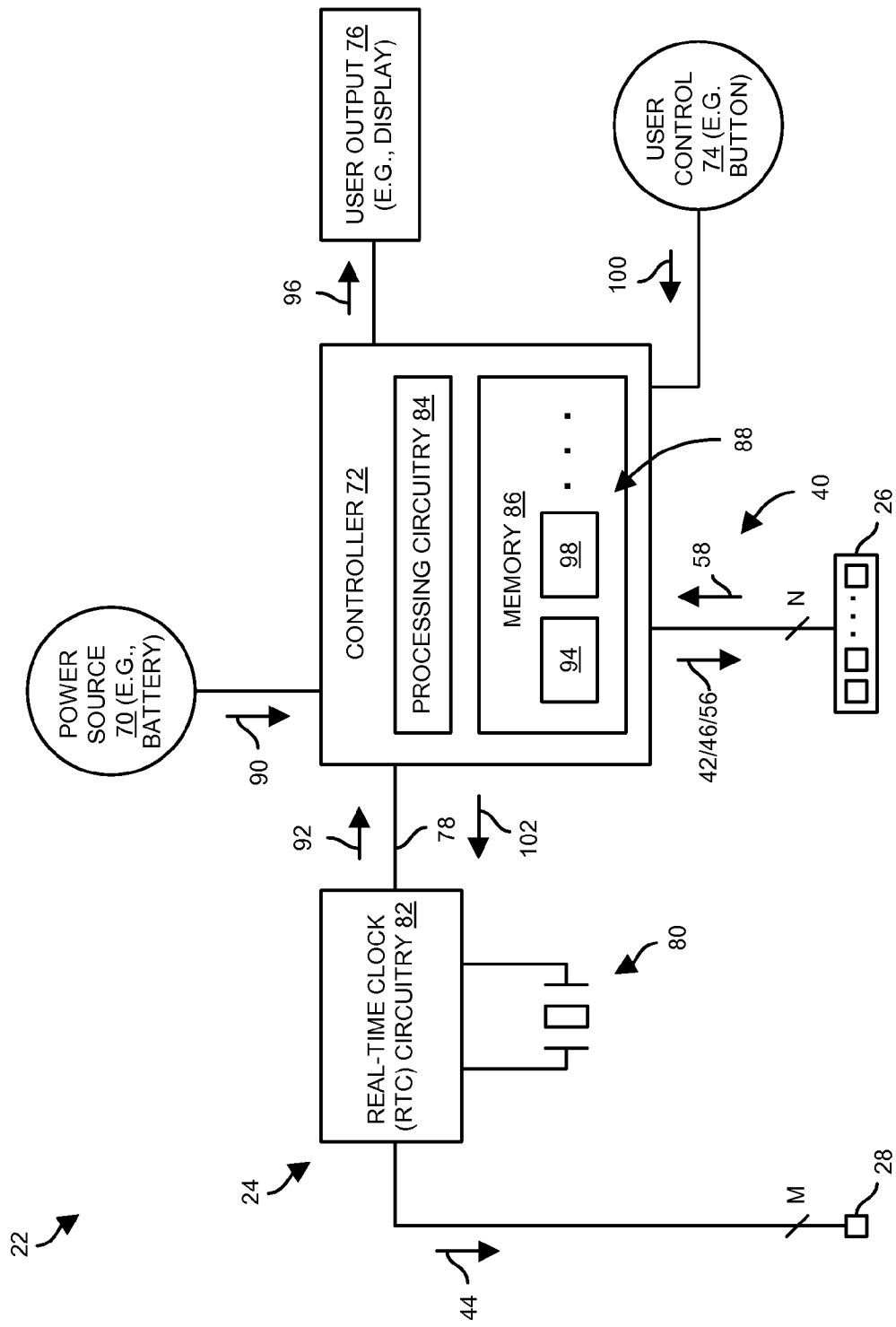
FIG. 2 is a block diagram of particular details of the electronic device of FIG. 1.

FIG. 2 is a block diagram showing particular details of the electronic device 22. As shown, the electronic device 22 includes the earlier-mentioned RTC circuit 24, the set of programming contacts 26, and the clock output pad 28 (also see FIG. 1). Additionally, the electronic device 22 includes a power source 70 (e.g., a battery or other ultra low power source), a controller 72, an optional user control 74 (e.g., a button or other type of input device), a user output 76 (e.g., an LCD display or other type of output device), and an RTC interface 78. The RTC circuit 24 includes a crystal oscillator 80 and real-time clock circuitry 82 (e.g., a specialized RTC chip or component). The RTC interface 78 (e.g., an I2C bus or similar electronic communications path) facilitates signal exchange between the RTC circuit 24 and the controller 72.

As further shown in FIG. 2, the controller 72 includes processing circuitry 84 (e.g., a microprocessor) and memory 86. As will be explained in further detail shortly, the memory 86 is configured to store a variety of memory constructs 88 (e.g., firmware, a time correction parameter, unique identifying information, etc.). Although a ground reference is omitted in FIG. 2 for simplicity, it should be understood that a ground reference exists within the electronic device 22.

It should be further understood that, by way of example only, the electronic device 22 is capable of operating as an authentication token which is driven by the RTC circuit 24. Those of skill in the art will understand that the electronic device 22 may take other forms as well such as other types of time-related and/or security-related equipment (e.g., watches, clocks, independent or modularized components, other portable devices, etc.), and other electronic apparatus which may be limited to drawing power from ultra low power sources.

Before the electronic device 22 is available to a user, a manufacturer puts the electronic device 22 through a configuration/activation/personalization process as described earlier with reference to FIG. 1. In particular, calibration circuitry and programming equipment such as the programming station 20 (FIG. 1) exchanges signals 42, 44, 46, 56, 58 (referred to generally as signals 40) with the electronic device 22. Following this process, the electronic device 22 (i) possesses the direction and correction interval information stored within the correction parameter 48 which can be used for time correction, and (ii) is now ready for normal user operation.

During normal user operation, the power source 70 supplies power 90 to the controller 72, and the RTC circuit 24 provides RTC values 92 to the controller 72. Additionally, the processing circuitry 84 runs an application 94 stored in a non-volatile portion of the memory 86 (e.g., flash memory, masked ROM, etc.). In the context of an authentication token, the processing circuitry 72 is programmed to interpret an RTC value 92 as a time representation, make adjustments to the time representation, output a one-time passcode (OTP) 96 on the user output 76 based on (i) a seed (or encryption key) 98 stored in the memory 86 and (ii) the adjusted time representation.

Preferably, the electronic device 22 is able to transition out of a sleep (or inactive) mode in response to a certain events in order to conserve power. In particular, the electronic device 22 is arranged to wake-up and provide a user with a OTP 96 in response to a user action. That is, when a user actuates the user control 74 (e.g., a button press, a signal on a USB port, etc.), the controller 72 receives a user activation signal 100 (i.e., an event signal) from the user control 74. In response, the controller 72 sends a request signal 102 to the RTC circuit 24 through the RTC interface 78 requesting an RTC value 92. When the controller 72 obtains the RTC value 92 from the RTC circuit 24, the controller 72 analyzes the time represented by the RTC value 92 and generates a more correct time representation. The controller 72 then generates OTP 96 (e.g., a different OTP 96 for each different minute of operation), and outputs the OTP 96 on the user output 76 (e.g., an LCD display, a USB port, etc.). The controller 72 further utilizes this more correct time reference when obtaining a new RTC value 92 from the RTC circuit 24 in the future.

Additionally, the RTC circuit 24 preferably includes an internal wake-up feature (e.g., an alarm function) that enables the RTC circuit 24 to routinely correct its notion of current time. In particular, the RTC circuit 24 (i) wakes itself up (i.e., an internal event driven operation), (ii) activates the controller 72, and (iii) provides an RTC value 92 to the controller 72. Again, when the controller 72 obtains the RTC value 92 from the RTC circuit 24, the controller 72 analyzes the time represented by the RTC value 92 and generates a more correct time representation. The controller 72 then utilizes this more-correct time reference when obtaining a new RTC value 92 from the RTC circuit 24 in the future. However, the controller 72 does not need to generate a OTP 96 since the user has not requested one. Such a self-correcting operation alleviates the need for a more-extensive self-correction analysis in the future since the notion of time within the electronic device 22 is now more accurate. In some arrangements, the wake-up function is programmed to activate the controller 72 once a week (i.e., in 7 day intervals) to enable the controller 72 to perform time correction on a regular basis.

As will be explained in further detail shortly, generation of the more-correct time representation based on time represented by the RTC value 92 involves the use of the direction and correction interval information stored within the correction parameter 48 which was acquired during the earlier-performed configuration/activation/personalization process. This adjusted time representation is at least as accurate as the current time represented by the RTC value 92. With the adjusted time representation now available within the electronic device 22, the electronic device 22 is now able to base future time representations on this adjusted time representation. Accordingly, the electronic device 22 is able to self-correct its time thus alleviating the need for an authentication entity to impose a wide OTP window. Further details of this time self-correction process performed by the controller 72 will now be provided with reference to FIG. 3.

Figure 3:
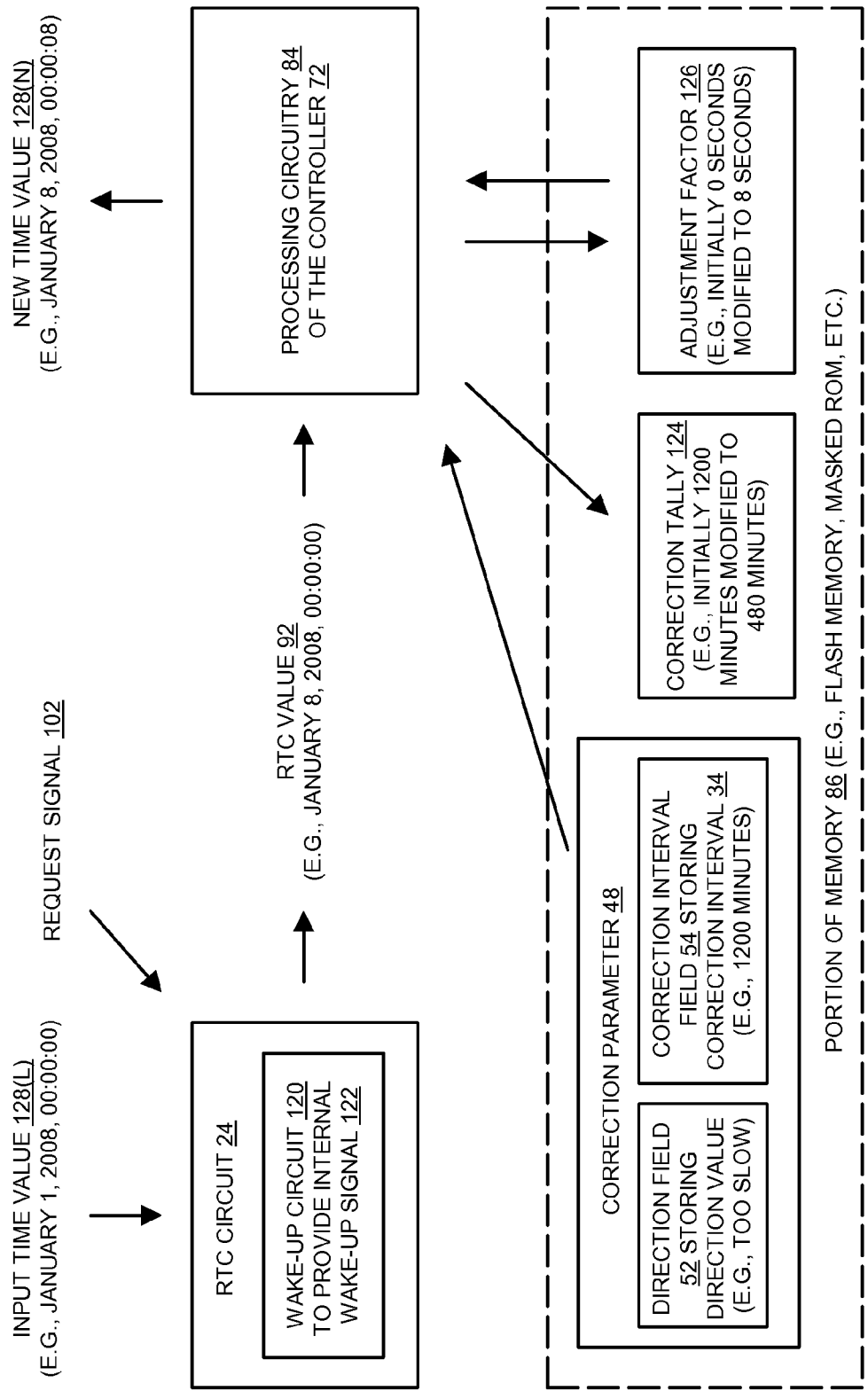
FIG. 3 is a block diagram of a portion of the electronic device of FIG. 2 which involves time correction.

FIG. 3 is a block diagram of a portion of the electronic device 22 which involves time correction. As shown, the RTC circuit 24 includes a wake-up circuit 120 which generates a wake-up signal 122 periodically for routine event driven operation. In some arrangements, the wake-up circuit 120 is configured to wake-up automatically once a week (i.e., every 10,080 minutes) and activate the processing circuitry 84 of the controller 72 to enable the processing circuitry 84 to carry out a time correction operation. Also shown is the request signal 100 which is sent to the RTC circuit 24 from the processing circuitry 84 in response to receipt of the user activation signal 100 from the user control 74 (also see FIG. 2). In response to either of the wake-up signal 122 or the request signal 100, the RTC circuit 24 is arranged to provide an RTC value 92 representing current time.

As further shown in FIG. 3, a portion of the memory 86 stores the correction parameter 48, a correction tally field 124, and an adjustment factor field 126. In some arrangements, one or more of these fields 48, 124, 126 reside in a non-volatile section of the memory 86 (e.g., flash memory). The processing circuitry 84 of the controller 72 is arranged to access these fields 48, 124, 126 when determining how much time to add or subtract from time representations obtained from the RTC circuit 24 in order to more accurately identify the actual current time. In particular, the processing circuitry 84 is able to calculate how many times the correction interval 34 spans the amount of time that has elapsed since the last time correction operation and thus compute how many seconds to add or subtract to time represented by RTC values 92.

To this end, recall that the direction field 52 of the correction parameter 48 indicates whether the RTC circuit 24 operates too fast (e.g., the direction field stores "1") or too slow (e.g., the direction field stores "0"). Additionally, the correction interval field 54 stores the correction interval 34 which indicates how many minutes of operation it will take for the RTC circuit 24 to be off by one second. Furthermore, the correction tally field 124 operates as a rolling counter (initialized to either the correction interval 34 or zero minutes), and the adjustment factor field 126 holds the number of seconds that the time from the RTC circuit 24 is off (initialized to zero seconds).

An example of the time correction process will now be provided. Suppose that the correction parameter 48 indicates that the RTC circuit 24 is one second behind every 1200 minutes. That is, the direction field 52 stores "0" indicating that the RTC circuit 24 is slightly too slow, and the correction interval field 54 stores the correction interval 34 which is 1200 minutes. Additionally, suppose that the correction tally field 124 initially holds 1200 minutes as the correction interval 34, and that the adjustment factor field 126 initially holds a null value (i.e., zero seconds of correction).

Further suppose that the last input time 128(L) to the RTC circuit 24 is "Jan. 1, 2008, 00:00:00" and that one week (i.e., 10,080 minutes) has passed since inputting that time. Accordingly, in response to operation of the oscillator 80, the RTC circuit 24 automatically wakes up (e.g., due to the built-in wake-up event feature) to activate the controller 72. As a result, the RTC circuit 24 provides an RTC value 92 which represents its notion of the current time, i.e., "Jan. 8, 2008, 00:00:00".

In response to activation, the processing circuitry 84 of the controller 72 calculates the number of times the correction interval 34 spans a difference between (i) the time represented by the RTC value 92 and (ii) the input time value 128(L) by utilizing the various fields 124, 126 of the memory 86. In particular, the processing circuitry 84 increments (i.e., counts up) the time represented by the input time value 128(L) (i.e., "Jan. 1, 2008, 00:00:00") until it reaches the time represented by the RTC value 92 (i.e., "Jan. 8, 2008, 00:00:00"). The processing circuitry 84 concurrently decrements (i.e., counts down) the contents of the correction tally field 124 (initialized to 1200 minutes in this example). Each time the processing circuitry 84 counts through the amount of the correction interval 34, the processing circuitry 84 increments the contents of the adjustment factor 126 by one second (initialized to zero).

In this example, the difference between "Jan. 1, 2008, 00:00:00" and "Jan. 8, 2008, 00:00:00" is 10,080 minutes. As the processing circuitry 84 counts up 10,080 minutes from "Jan. 1, 2008, 00:00:00" to "Jan. 8, 2008, 00:00:00", the processing circuitry 84 counts down the contents of the correction tally field 124. Accordingly, when the processing circuitry 84 counts up 1200 minutes from "Jan. 1, 2008, 00:00:00" to "Jan. 1, 2008, 20:00:00", the processing circuitry 84 simultaneously counts down the contents of the correction tally field 124 to reach zero. At this point, the processing circuitry 84 increments the contents of the adjustment factor 126 from zero seconds to one second, and resets the contents of the correction tally field 124 to 1200 minutes (e.g., the processing circuitry 84 simply stores the correction interval 34 in the correction tally field 124).

Then, the processing circuitry 84 continues counting up another 1200 minutes from "Jan. 1, 2008, 20:00:00" to "Jan. 2, 2008, 16:00:00", until the contents of the correction tally field 124 again have been decremented down to zero. At this point, the processing circuitry 84 increments the contents of the adjustment factor 126 from one second to two seconds, and again resets the contents of the correction tally field 124 to 1200 minutes.

Such processing continues until the processing circuitry 84 has counted up a total of 10,080 minutes to reach "Jan. 8, 2008, 00:00:00". After such processing, the correction tally field 124 holds 480 minutes, and adjustment factor field 126 holds 8 seconds. Accordingly, the processing circuitry 84 has determined that the time represented by the RTC value 92, i.e., "Jan. 8, 2008, 00:00:00" is off by 8 seconds. Furthermore, the processing circuitry 84 knows the direction (i.e., too fast or too slow) based on the contents of the direction field 52. Since the RTC circuit 24 is too slow in this example, the processing circuitry 84 adds 8 seconds to the time represented by the RTC value 92 and outputs a new time value 128(N) indicating "Jan. 8, 2008, 00:00:08" as the actual current time. Additionally, the processing circuitry 84 resets the contents of the adjustment factor 126 to the null value (i.e., zero seconds of correction), but purposefully preserves the contents of the correction tally field 124 (i.e., 480 minutes) for future use. As a result, the above-described time correction process is a robust and reliable means of adjusting for imperfections in the oscillator 80 of the RTC circuit 24 (FIG. 2).

It should be understood that with the new time value 128(N) being more accurate than the time represented by the RTC value 92 (i.e., 8 seconds of slowness added back), the electronic device 22 is able to use the time represented by the new time value 128(N) as the actual current time going forward. That is, the electronic device 22 is now capable of re-performing the above-described time correction operation in the future, but using the time represented by the new time value 128(N) (i.e., "Jan. 8, 2008, 00:00:08" in this example) as the input time value 128(L). Accordingly, the electronic device 22 is able to correct time in a secure, self-contained manner.

Moreover, due to routine self-correction (e.g., every 7 days), the RTC circuit 24 of the electronic device 22 is never off by more than 8 seconds in this example. As a result, the amount of time required to perform a future self-correction operation is on the order of microseconds or milliseconds since the number of computations is not allowed to extensively accumulate.

As mentioned earlier, the above-described electronic device 22 is well suited for application as an authentication token. Along these lines, in connection with the weekly scheduled self-correction operations, such corrections can be made transparent to the user. In particular, if the self-correction task was initiated by the wake-up circuit 120, the electronic device 22 does not need to provide an associated output to the user upon completion of the self-correction task.

However, when the user actuates the user control 74 to send the user actuation signal 100 to the controller 72, the user expects to obtain a OTP 96 in short order. Accordingly, in response to the user actuation signal 100, the processing circuitry 84 carries out the above-described time correction process, generates a OTP 96 based on the new time value 128(N), and provides the OTP 96 to the user output 76 (also see FIG. 2). In some arrangements, the processing circuitry 84 checks the actual current time represented by the new time value 128(N) and, if the actual current time indicates a transition into a time window requiring a new seed 98 (e.g., the electronic device 22 may derive a new seed 98 based on a set schedule such as every day and/or week), the electronic device 22 derives the new seed 98 and replaces the prior seed 98 with the new seed 98 in the memory 86 (FIG. 2). The processing circuitry 84 then generates the OTP 96 based on the stored seed 98.

Again, since the RTC circuit 24 is never off by more than a modest amount of time (i.e., 8 seconds in the example), the amount of time required to perform the time correction operation (FIG. 3), possible new seed 98 derivation, and OTP 96 generation, is on the order of microseconds or milliseconds. Accordingly, the electronic device 22 provides the user with a very acceptable response time. Further details will now be provided with reference to FIG. 4.

Figure 4:
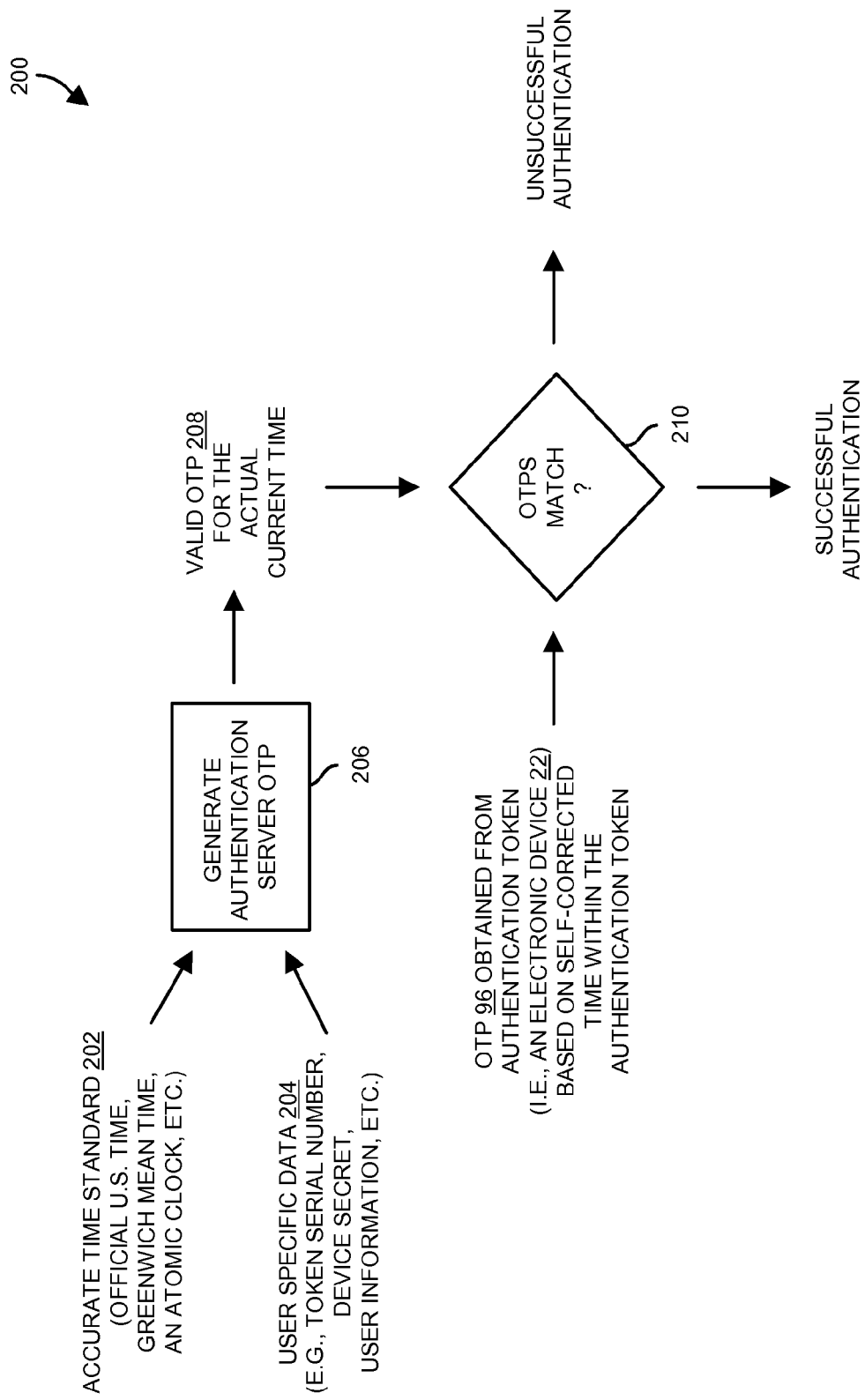
FIG. 4 is a block diagram of an authentication operation which evaluates an OTP from an authentication token having the architecture of the electronic device of FIG. 2.

FIG. 4 shows an authentication process 200 which is performed by an authentication server and which involves a OTP 96 obtained from an authentication token with time self-correction (also see the electronic device 22 in FIGS. 1-3). As shown, the authentication server has access to an accurate time standard 202 (e.g., Official U.S. Time, GMT, an atomic clock, etc.). Additionally, the authentication server has access to user specific data 204 (e.g., a serial number of the authentication token, a secret of the authentication token, user information, etc.). Based on the time standard 202 and user specific data 204, the authentication server carries out an OTP generation operation 206 which provides a valid OTP 208 for the actual current time.

Next, the authentication server performs a compare operation 210 which determines whether the OTP 96 obtained from the authentication token matches with the valid OTP 208 generated by the authentication server. If the OTP 96 and the OTP 208 match, the authentication server deems authentication to be successful. However, if the OTP 96 and the OTP 208 do not match, the authentication server deems authentication to be unsuccessful.

For a convenient and practical safety margin, the authentication server may optionally perform the OTP generation operation 206 for adjacent minutes. For instance, the authentication server may deem it to be acceptable for there to be a small delay in the user providing the OTP 96 to the authentication server and thus slightly widen the time period for valid OTPs (e.g., +/−3 minutes, +/−5 minutes, etc.).

Nevertheless, it should be understood that the time period for valid OTPs which is imposed by the authentication server to account for imperfections within the crystal oscillator driving the authentication token is able to be quite narrow due to the high time accuracy of the authentication token. In particular, since the authentication token carries out a time correction operation immediately before deriving the OTP 96, there is a high likelihood that the OTP 96 matches the OTP 208 thus alleviating the need to extensively widen the time period.

Additionally, it should be understood that there is no requirement that the operations 206 and 210 be performed on a single machine. Rather, it is quite acceptable for one machine to carry out the OTP generation operation 206 (e.g., an authentication server under control of an authentication service company), and for another machine to carry out the OTP matching operation 210 (e.g., a third-party company that requires the user to properly authenticate before providing access to a third-party service). Further details will now be provided with reference to FIG. 5.

Figure 5:
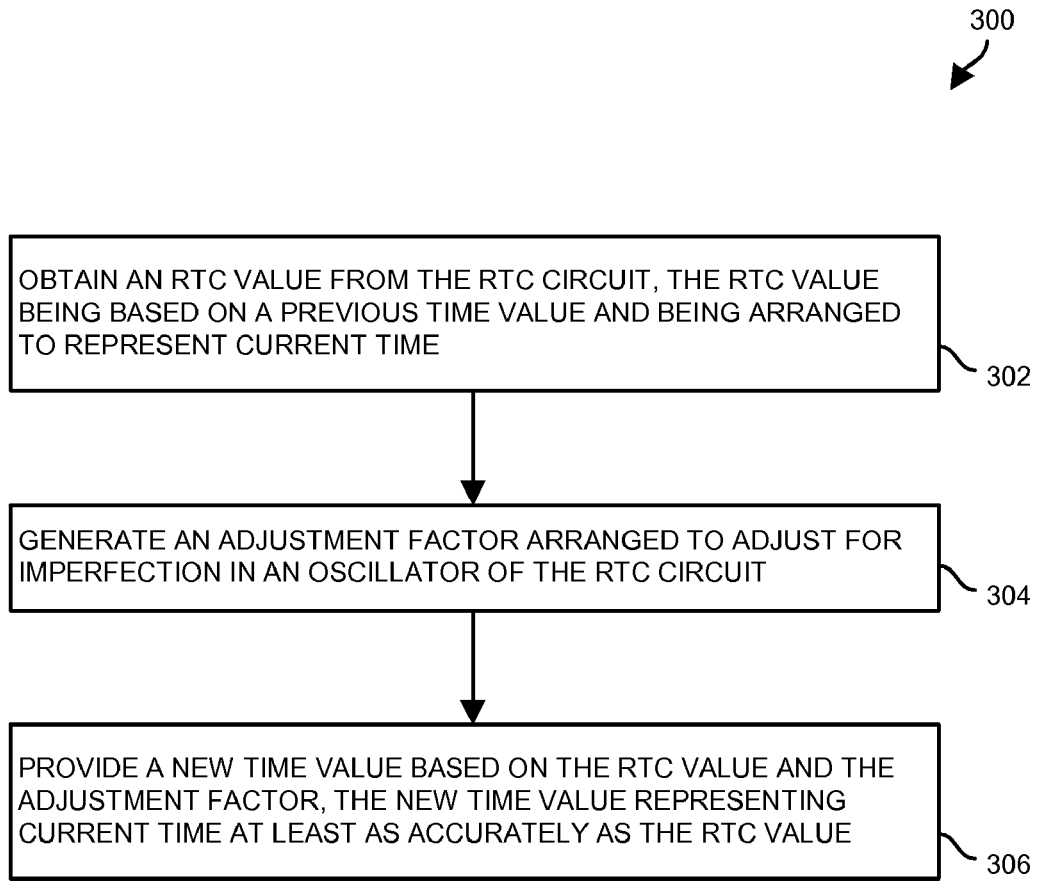
FIG. 5 is a flowchart of a procedure which is performed by the electronic device of FIG. 2.

FIG. 5 is a flowchart of a procedure 300 which is performed by the electronic device 22 when self-correcting for oscillator imperfections in the RTC circuit 24. In step 302, the processing circuitry 84 of the controller 72 obtains an RTC value 92 from the RTC circuit 24 (FIG. 2). As described earlier, the RTC value 92 is based on a previous time value 128(L) and is arranged to represent current time (FIG. 3).

In step 304, the processing circuitry 84 generates an adjustment factor 126 arranged to adjust for imperfection in the oscillator 80 of the RTC circuit 24 (FIGS. 2 and 3). In particular, the processing circuitry 84 computes how many seconds the RTC circuit 24 is ahead or behind actual current time 202 (FIG. 4) by determining how many times the correction interval 34 spans the amount of time that has elapsed since the last time correction operation was performed.

In step 306, the processing circuitry 84 provides a new time value 128(N) based on the RTC value 92 and the adjustment factor 126. The new time value 128(N) represents current time at least as accurately as the RTC value 92. Accordingly, the new time value 128(N) is suitable for use in generating a valid OTP 96 as well as a new time reference for a future self-correction operation, i.e., for use as the next time value 128(L) when the processing circuitry 84 self-corrects in the future. Further details will be provided with the following additional example and with reference to FIG. 6.

Figure 6:
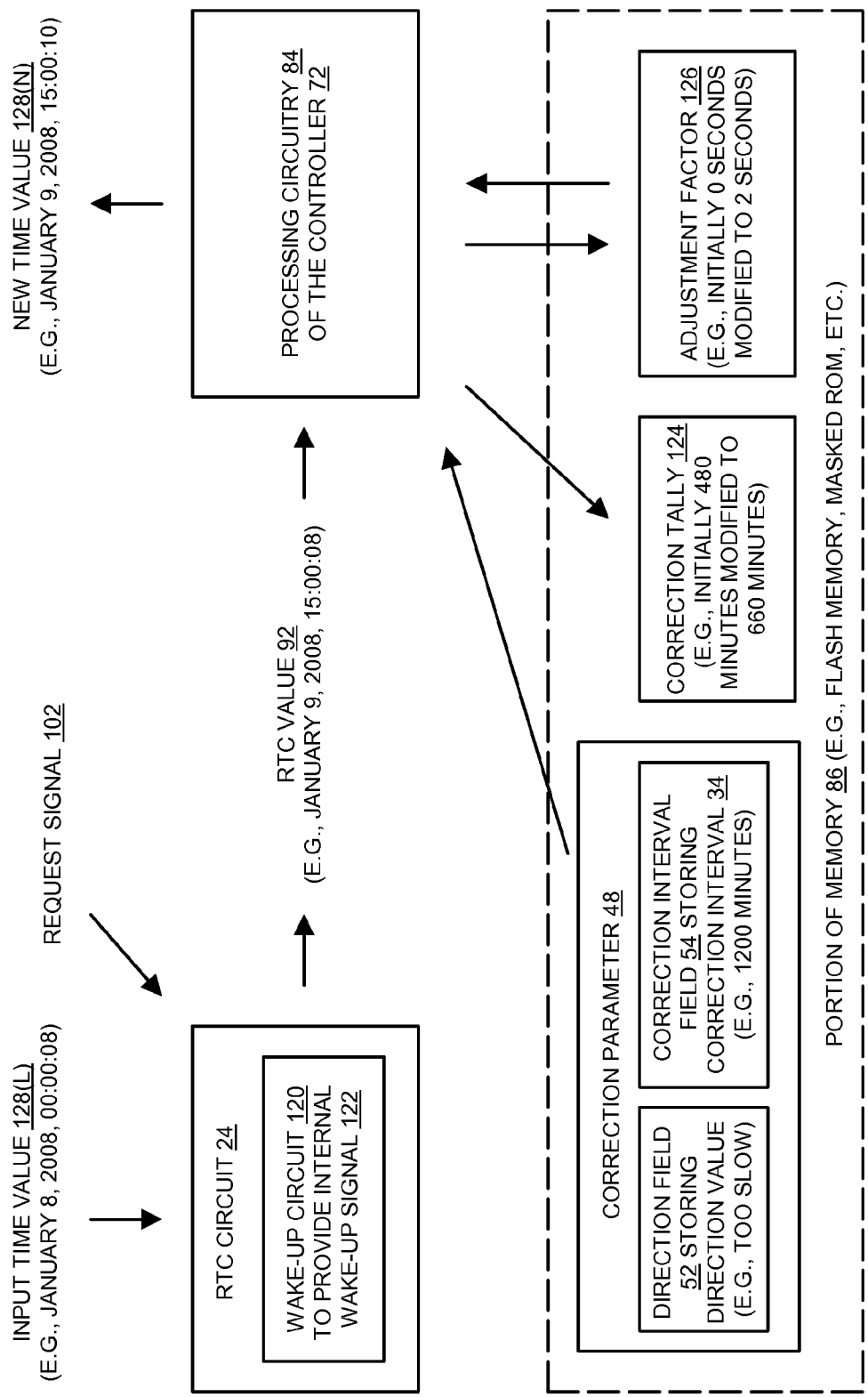
FIG. 6 is a block diagram of a time correction example.

FIG. 6 illustrates a portion of the operation of the electronic device 22 when the user actuates the user control 74 (FIG. 2) at an arbitrary time after completion of the self correction process as shown in FIG. 3. In particular, suppose that the user intends to obtain a valid OTP 96 to authenticate with an authentication entity.

Recall that the correction tally field 124 of the memory 86 still stores 480 minutes from the last self correction operation, and the adjustment factor 126 has been reset to the null value. Furthermore, the input time value 128(L) to the RTC circuit 24 is now "Jan. 8, 2008, 00:00:08" since this is the most recently corrected time within the electronic device 22. Now, suppose that the user actuates the user control 74 after some additional time passes. In particular, suppose that another 2,340 minutes passes so that the RTC circuit 24 is now arranged to output "Jan. 9, 2008, 15:00:08" as an RTC value 92.

Here, the processing circuitry 84 of the controller 72 responds to the user actuation signal 100 from the user control 74 by sending a request signal 102 to the RTC circuit 24. In turn, the RTC circuit 24 provides a RTC value 92 representing the time as "Jan. 9, 2008, 15:00:08".

Upon receipt of the RTC value 92 from the RTC circuit 24, the processing circuitry 84 computes the number of times the correction interval 34 spans a difference in the time represented by the RTC value 92 and the input time value 128(L). In particular, the processing circuitry 84 increments the time represented by the input time value 128(L) (i.e., "Jan. 8, 2008, 00:00:08") until it reaches the time represented by the RTC value 92 (i.e., "Jan. 9, 2008, 15:00:08"). The processing circuitry 84 concurrently decrements the contents of the correction tally field 124 (which now holds 480 minutes in this example). Again, each time the processing circuitry 84 counts through the amount of the correction interval 34, the processing circuitry 84 increments the contents of the adjustment factor 126 by one second (initialized to zero). Since the correction tally field 124 holds 480 minutes, the operation of the processing circuitry 84 is not susceptible to a rounding error that would otherwise exist if the contents of the correction tally field 124 had been reinitialized to the correction value 34.

Accordingly, when the processing circuitry 84 counts up 480 minutes from "Jan. 8, 2008, 00:00:08" to "Jan. 8, 2008, 08:00:08", the processing circuitry 84 simultaneously counts down the contents of the correction tally field 124 to reach zero. At this point, the processing circuitry 84 increments the contents of the adjustment factor 126 from zero seconds to one second, and resets the contents of the correction tally field 124 to 1200 minutes.

The processing circuitry 84 then continues counting up 1200 minutes from "Jan. 8, 2008, 08:00:08" to "Jan. 9, 2008, 04:00:08", until the contents of the correction tally field 124 again have been decremented down to zero. At this point, the processing circuitry 84 increments the contents of the adjustment factor 126 from one second to two seconds, and again resets the contents of the correction tally field 124 to 1200 minutes.

Such processing continues until the processing circuitry 84 has counted up a total of 2,340 minutes to reach "Jan. 9, 2008, 15:00:08". After such processing, the correction tally field 124 holds 660 minutes, and adjustment factor field 126 holds 2 seconds. Accordingly, the processing circuitry 84 has determined that the time represented by the RTC value 92, i.e., "Jan. 9, 2008, 15:00:08" is off by 2 seconds. Additionally, since the RTC circuit 24 is too slow in this example (i.e., the direction field 52 stores "0", the processing circuitry 84 adds 2 seconds to the time represented by the RTC value 92 and outputs a new time value 128(N) indicating "Jan. 9, 2008, 15:00:10" as the actual current time. Furthermore, the processing circuitry 84 resets the contents of the adjustment factor field 126 back to the null value, but maintains the contents of 660 minutes in the correction tally field 124 for the next time-correction task.

Again, with the new time value 128(N) being more accurate than the time represented by the RTC value 92 (i.e., 2 more seconds of slowness added back), the electronic device 22 is able to use the time represented by the new time value 128(N) as the actual current time going forward. Furthermore, the processing circuitry 84 is now able to generate and display the OTP 96 using substantially the same time as the accurate time standard 202 (FIG. 4) used by the authentication server. For robust and reliable operation, the electronic device 22 is able to continue time self-correction during the lifetime of the electronic device 22 and within an ultra low power environment.

As described above, improved techniques correct for time inaccuracies in electronic devices 22 by performing time adjustments (e.g., pre-configured self-contained time corrections). Such techniques enable authentication tokens (and other electronic modules) to regularly resynchronize with actual current time during their lifetimes. Accordingly, such techniques alleviate the need to widen valid OTP time windows, or alternatively can be used in conjunction with widening valid OTP time windows to reduce the extent of such widening. Moreover, such correction operations alleviate the need for any future internal electronic access of the authentication tokens thus preserving token security.

While various embodiments of the invention have been particularly shown and described, it will be understood by those skilled in the art that various changes in form and details may be made therein without departing from the spirit and scope of the invention as defined by the appended claims.

For example, it should be understood that the RTC value 92 was described above as being arranged to represent current time. In alternative arrangements, the RTC value 92 does not represent current time, but is simply a counter value which increments (or decrements) in response to a signal from the oscillator 80 (FIG. 2) to output a rough delta time. In such alternative arrangements, the processing circuitry 84 of the controller 72 is arranged to obtain the RTC value 92 (in this case, the RTC value 92 is an oscillator value from an oscillator circuit). Next, the processing circuitry 84 is arranged to generate an adjustment factor 126 (a number of seconds that the RTC circuit 24 is ahead or behind) arranged to adjust for imperfection in a crystal of the oscillator circuit, i.e., determine the number of times the correction interval 34 spans the oscillator value, i.e., the delta time. Then, the processing circuitry 84 is arranged to provide a new time value 128(N) based on (i) a previous time value 128(L) advanced by the oscillator value and (ii) the adjustment factor 126. The new time value 128(N) represent current time at least as accurately as an alternative time value based on the previous time value 128(L) advanced by the oscillator value but without being based on the adjustment factor 126.

Additionally, it should be understood that particular components can reside in different locations but still accomplish the same results. For instance, the RTC circuitry 82 of the RTC circuit 24 (FIG. 2) was described above as being separate from the controller 72 by way of example only. In other arrangements, the RTC circuitry 82 is tightly integrated with the processing circuitry 84 (e.g., within a single microprocessor). In these arrangements, preferably the RTC circuitry 82 is disposed within a microprocessor, and a crystal directly attaches to the microprocessor.

As another example, the frequency counter 32 (FIG. 1) was described above as belonging to the programming station 20 by way of example only. In other arrangements, the frequency counter 32 resides within the electronic device 22.

Furthermore, it should be understood that the environment for the various components of the electronic device 22 was described above as being an authentication token by way of example only. There are a variety of suitable applications for such components particularly when access to power is extremely limited (e.g., in ultra low power environments) such as in Smart Card environments, display cards, key fobs, and other remote devices, and/or when the designated lifetimes of the components are relatively long (e.g., three years, five years, 10 years, etc.).

Additionally, it should be understood that the electronic device 22 was described above as allowing the programming equipment 30 to externally determine the correction interval 34 by way of example only. In other arrangements, the programming equipment 30 is arranged to input a raw value of the ideal frequency 50 into the electronic device 22. In the arrangements, the electronic device 22 is arranged to then determine whether the RTC circuit 24 is too fast or too slow and internally compute the correction interval 34 by carrying out an analysis similar to that described above for the programming equipment 30. Such alternative arrangements enable the initial calibration process to take place in a less secure setting such as a less secure token manufacturing location since the process for computing the correction interval no longer needs to be shared with the manufacturer and can be securely stored in the authentication token.

Furthermore, it should be understood that the calibration process is capable of taking place at a time other than the time of manufacturing. For example, in some arrangements, the programming equipment 30 measures the frequency, and stores the measured frequency and/or the correction interval and direction value in the local memory 86 of the electronic device 22 (FIG. 2) or the central database 60 (FIG. 1) at the time of manufacturing. At a later time and perhaps at a different location, other programming equipment 30 then inputs configuration information into the electronic device 22. Such arrangements are well suited for authentication tokens which are manufactured in multiple locations. For instance, a display card can be assembled in one (less secure) location, inputted with the crystal frequency and then sent to a secure location for inputting of the token secrets and final lamination.

Additionally, it should be understood that the correction interval 34 was described above as being the number of minutes that must elapse before the RTC circuit 24 of the electronic device 22 is off by one second by way of example only. In other arrangements, the correction interval 34 is based on different units and/or values. For example, in some arrangements, the correction interval 34 is the number of minutes that must elapse before the RTC circuit 24 of the electronic device 22 is off by a predetermined amount of time which is different than one second (e.g., two seconds, three seconds, etc.). In other arrangements, the correction interval 34 is a different amount of time (e.g., 10 minutes, two hours, one day, etc.) that must elapse before the RTC circuit 24 of the electronic device 22 is off by the predetermined amount of time.

Furthermore, it should be understood that it is statistically possible that the oscillator frequency of the RTC circuit 24 is equal to the reference frequency 50 (FIG. 1). In such situations, the programming equipment 30 is capable of configuring the electronic device 22 not to perform any time correction process (e.g., setting the direction field 52 to "0" and the correction interval field 54 to "0" with the application 94 then detecting and handling this situation in a specialized manner).

Additionally, it should be understood that the user control 74 of the electronic device 22 (e.g., a button) is optional. In alternative arrangements, the electronic device 22 does not include the user control 74 and the user output 76 is always on. In these alternative arrangements, the OTP 96 output on the user output 76 (e.g., a passcode is displayed constantly on an LCD display and changes automatically).

Furthermore, it should be understood that the electronic device 22 was described above as keeping current time in the memory 86 of the controller 72 by way of example only. In other arrangements, the RTC circuit 24 reinitializes (i.e., loads the current time from the controller 72) after the controller 72 generates the more accurate current time. Such modifications and enhancements are intended to belong to various embodiments of the invention.

What is claimed is:

1. In an electronic device having a real-time clock (RTC) circuit, a method comprising:
   obtaining an RTC value from the RTC circuit, the RTC value being based on a previous time value and being arranged to represent current time;
   generating an adjustment factor arranged to adjust for imperfection in an oscillator of the RTC circuit;
   providing a new time value based on the RTC value and the adjustment factor, the new time value representing current time at least as accurately as the RTC value; and
   supplying a user passcode based on the new time value, the user passcode being arranged to authenticate a user of the electronic device.

2. A method as in claim 1 wherein supplying the user passcode includes:
   deriving a passcode seed based on the new time value;
   creating, as the user passcode, a one-time passcode based on the passcode seed; and
   outputting the one-time passcode on a display of the electronic device.

3. A method as in claim 1, further comprising:
   prior to obtaining, generating, and providing, receiving an event signal indicating an occurrence of an event;
   wherein the RTC value is obtained from the RTC circuit in response to receipt of the event signal;
   wherein the adjustment factor is generated in response to the event signal; and
   wherein the new time value is provided in response to the event signal.

4. A method as in claim 3 wherein receiving the event signal includes:
   acquiring the event signal in response to actuation of a button circuit by a user.

5. In an electronic device having a real-time clock (RTC) circuit, a method comprising:
   obtaining an RTC value from the RTC circuit, the RTC value being based on a previous time value and being arranged to represent current time;
   generating an adjustment factor arranged to adjust for imperfection in an oscillator of the RTC circuit;
   providing a new time value based on the RTC value and the adjustment factor, the new time value representing current time at least as accurately as the RTC value; and
   prior to obtaining, generating, and providing, receiving an event signal indicating an occurrence of an event;
   wherein the RTC value is obtained from the RTC circuit in response to receipt of the event signal;
   wherein the adjustment factor is generated in response to the event signal;
   wherein the new time value is provided in response to the event signal; and
   wherein receiving the event signal includes acquiring the event signal in response to a wake-up operation performed by the RTC circuit.

6. In an electronic device having a real-time clock (RTC) circuit, a method comprising:
   obtaining an RTC value from the RTC circuit, the RTC value being based on a previous time value and being arranged to represent current time;
   generating an adjustment factor arranged to adjust for imperfection in an oscillator of the RTC circuit;
   providing a new time value based on the RTC value and the adjustment factor, the new time value representing current time at least as accurately as the RTC value;
   wherein a memory of the electronic device stores a predetermined correction interval; and
   wherein generating the adjustment factor includes:
   indicating, as the adjustment factor, a number of times the predetermined correction interval stored in the memory spans a range between the previous time value and the RTC value.

7. A method as in claim 6 wherein the predetermined correction interval represents a number of minutes before any RTC value from the RTC circuit is behind current time by substantially a predetermined amount of time due to imperfection in the oscillator of the RTC circuit; and wherein providing the new time value based on the RTC value and the adjustment factor includes:
   providing, as the new time value, a result of the RTC value increased by one second for each time the predetermined correction interval spanned the range between the previous time value and the RTC value.

8. A method as in claim 6 wherein the predetermined correction interval represents a number of minutes before any RTC value from the RTC circuit is ahead of current time by substantially a predetermined amount of time due to imperfection in the oscillator of the RTC circuit; and wherein providing the new time value based on the RTC value and the adjustment factor includes:
providing, as the new time value, a result of the RTC value decreased by one second for each time the predetermined correction interval spanned the range between the previous time value and the RTC value.

9. A method as in claim 6, further comprising:
outputting a frequency of the oscillator of the RTC circuit to a calibration circuit; and
loading the predetermined correction interval from the calibration circuit into the memory for use in generating the adjustment factor.

10. A method as in claim 9 wherein the calibration circuit is external to the electronic device.

11. A method as in claim 9 wherein the calibration circuit is internal to the electronic device.

12. A method as in claim 1 wherein the RTC circuit is external to a microprocessor of the electronic device, the microprocessor being arranged to obtain the RTC value from the RTC circuit, generate the adjustment factor, and provide the new time value.

13. A method as in claim 1 wherein the RTC circuit is internal to a microprocessor of the electronic device.

14. An electronic circuit, comprising:
a real-time clock (RTC) interface constructed and arranged to couple to an RTC circuit; and
processing circuitry coupled to the RTC interface, the processing circuitry being constructed and arranged to:
obtain an RTC value from the RTC circuit through the RTC interface, the RTC value being based on a previous time value and being arranged to represent current time,
generate an adjustment factor arranged to adjust for imperfection in an oscillator of the RTC circuit,
provide a new time value based on the RTC value and the adjustment factor, the new time value representing current time at least as accurately as the RTC value, and
supply a user passcode based on the new time value, the user passcode being arranged to authenticate a user.

15. An electronic circuit as in claim 14, further comprising:
a display coupled to the processing circuitry;
wherein the processing circuitry, when supplying the user passcode, is constructed and arranged to (i) derive a passcode seed based on the new time value, (ii) create, as the user passcode, a one-time passcode based on the passcode seed, and (iii) output the one-time passcode on the display to the user.

16. An electronic circuit, comprising:
a real-time clock (RTC) interface constructed and arranged to couple to an RTC circuit;
processing circuitry coupled to the RTC interface, the processing circuitry being constructed and arranged to:
obtain an RTC value from the RTC circuit through the RTC interface, the RTC value being based on a previous time value and being arranged to represent current time,
generate an adjustment factor arranged to adjust for imperfection in an oscillator of the RTC circuit, and
provide a new time value based on the RTC value and the adjustment factor, the new time value representing current time at least as accurately as the RTC value; and
a memory which stores a predetermined correction interval;
wherein the processing circuitry, when generating the adjustment factor is constructed and arranged to indicate, as the adjustment factor, a number of times the predetermined correction interval stored in the memory spans a range between the previous time value and the RTC value.

17. An electronic circuit as in claim 16 wherein a calibration circuit is constructed and arranged to acquire a frequency of the oscillator of the RTC circuit; and wherein the processing circuitry is further constructed and arranged to:
load the predetermined correction interval from the calibration circuit into the memory for use in generating the adjustment factor.

18. A method as in claim 1 wherein the electronic device is constructed and arranged to operate in an active mode during a first time period and a sleep mode during a second time period which is different than the first time period; and
wherein obtaining an RTC value from the RTC circuit includes receiving a value which is based an oscillator frequency of the RTC circuit, the oscillator frequency being substantially the same regardless of whether the electronic device is operating in the active mode during the first time period or whether the electronic device is operating in the sleep mode during the second time period.

19. An electronic circuit as in claim 14 wherein the electronic circuit is constructed and arranged to operate in an active mode during a first time period and a sleep mode during a second time period which is different than the first time period; and
wherein a frequency of the oscillator of the RTC circuit is substantially the same regardless of whether the electronic circuit is operating in the active mode during the first time period or whether the electronic circuit is operating in the sleep mode during the second time period.

20. An electronic circuit as in claim 16 wherein the electronic circuit is constructed and arranged to operate in an active mode during a first time period and a sleep mode during a second time period which is different than the first time period; and
wherein a frequency of the oscillator of the RTC circuit is substantially the same regardless of whether the electronic circuit is operating in the active mode during the first time period or whether the electronic circuit is operating in the sleep mode during the second time period.

* * * * *